(12) United States Patent
Okubo (10) Patent No.: US 10,140,074 B2
(45) Date of Patent: Nov. 27, 2018

(54) INFORMATION PROCESSING APPARATUS AND METHOD THEREFOR

(71) Applicant: CANON KABUSHIKI KAISHA, Tokyo (JP)

(72) Inventor: Yuzuru Okubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 15/161,004

(22) Filed: May 20, 2016

(65) Prior Publication Data

US 2016/0350046 A1 Dec. 1, 2016

(30) Foreign Application Priority Data

May 29, 2015 (JP) ................. 2015-110212

(51) Int. Cl.
*G06F 3/12* (2006.01)
*H04L 29/08* (2006.01)

(52) U.S. Cl.
CPC .......... *G06F 3/1273* (2013.01); *G06F 3/1207* (2013.01); *G06F 3/1229* (2013.01); *G06F 3/1288* (2013.01); *H04L 67/1095* (2013.01)

(58) Field of Classification Search
CPC ....... G06F 17/30; G06F 3/1207; G06F 3/1273

USPC .................................................. 707/600–899
See application file for complete search history.

(56) References Cited

U.S. PATENT DOCUMENTS

2011/0239162 A1* 9/2011 Kido .................... H04N 1/0044
715/838

FOREIGN PATENT DOCUMENTS

JP        2006-344020 A    12/2006

* cited by examiner

*Primary Examiner* — Isaac M Woo
(74) *Attorney, Agent, or Firm* — Canon U.S.A., Inc. IP Division (57) ABSTRACT

A client apparatus, which collects, from an image processing apparatus, information about a status of use of the image processing apparatus and transmits the collected information to a management server, acquires change histories of setting performed on a clock, which are recorded by a system of the client apparatus, both at timing at which the client apparatus acquires the information about the status of use from the image processing apparatus and at timing at which the client apparatus transmits the information to the management server, and also transmits, to the management server, information obtained from the acquired change histories.

7 Claims, 8 Drawing Sheets

INFORMATION PROCESSING APPARATUS AND METHOD THEREFOR

BACKGROUND OF THE INVENTION

Field of the Invention

Aspects of the present invention generally relate to a technique for collecting, from an apparatus connected to a network, information about a status of use of the apparatus and then managing the information about the status of use.

Description of the Related Art

There has conventionally been a method for connecting a plurality of apparatuses located around the world to a management server and periodically transmitting information about a status of use of each apparatus to the management server, thus managing the information about the status of use. The apparatuses serving as an object of management include, for example, printers.

The information about the status of use as used herein refers to, for example, state information, such as the number of sheets printed so far by a printer and the current remaining amount of ink, and various other pieces of log information. Here, in a case where the collected information is only used for product analysis or other purpose by a manufacturer of the apparatuses and no feedback using the collected information is given to users of the apparatuses, an information transmission function included in each apparatus can be said to be unnecessary for the users. This makes, also in view of a network load on the user environment, it impossible for the apparatuses to perform frequent communication with the management server. Therefore, such an operation may be performed as to transmit, to the management server, pieces of information that were collected by each apparatus for a specific period of time, in a lump.

Japanese Patent Application Laid-Open No. 2006-344020 discusses a technique for a printer to periodically transmit, to a management server, log information, which includes time (time of day) of processing and content of processing, and time (time of day) of transmission performed by the printer. To correctly manage the time at which the processing was performed by the printer, the management server corrects the time of processing included in the log information with the use of reference time measured by the management server and the time of transmission, which was transmitted from the printer to the management server.

There is also a client apparatus having the function to collect, from an image processing apparatus such as a printer, information indicating a status of use of the image processing apparatus and periodically transmit the collected information to a management server. In this case, it may be necessary for the management server to manage further information indicating the time at which the client apparatus collected the information indicating the status of use. In this instance, a clock included in the client apparatus may deviate in time from a clock used for analysis by the management server. In other words, it is necessary for the management server to correct, in consideration of such a deviation, the information indicating the time at which the client apparatus collected the information indicating the status of use with the use of a technique such as that discussed in Japanese Patent Application Laid-Open No. 2006-344020.

Furthermore, the time that is indicated by the clock of the client apparatus can be freely set and changed by the user of the client apparatus. For example, the user may change the setting of the clock once or more during a period from when the client apparatus collects the information indicating the status of use until the client apparatus transmits the collected information to the management server. In this case, it is impossible to appropriately correct the time at which the client apparatus collected the information indicating the status of use only based on the time at which the client apparatus transmitted the collected information and the time that is identifiable by the clock used by the management server.

SUMMARY OF THE INVENTION

According to an aspect of the present invention, a client apparatus having and a storage device a clock includes a reception unit configured to receive, from an image processing apparatus, information about a status of use of the image processing apparatus, an acquisition unit configured to acquire a first change history indicating a history of setting performed on the clock, which is recorded in the storage device running on a system of the client apparatus, a storing unit configured to store, as a first file, time information including time indicated by the clock when the reception unit receives the information about the status of use from the image processing apparatus, the first change history acquired by the acquisition unit, and the received information about the status of use into the storage device, a generation unit configured to, in a case where a determination is made that a timing at which to transmit the first file stored by the storing unit has been reached, generate a second file to be transmitted by appending, to the first file, time information including time indicated by the clock when the determination is made, and a transmission unit configured to transmit the second file generated by the generation unit to a management server, wherein, when the determination is made that the timing at which to transmit the first file stored by the storing unit has been reached, the acquisition unit further acquires a second change history indicating a history of setting performed on the clock, and wherein the generation unit generates the second file to be transmitted by further appending, to the first file, difference information obtained by using the first change history and the second change history.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Furthermore, unless otherwise described, the present invention can be naturally applied to not only a single apparatus (information processing apparatus) but also a system composed of a plurality of apparatuses as long as functions of the present invention are implemented. Moreover, unless otherwise described, the present invention can be naturally applied even to a system in which connection and processing are performed via a network, such as a local area network (LAN), a wide area network (WAN), or the Internet, as long as functions of the present invention are implemented.

Figure 1:
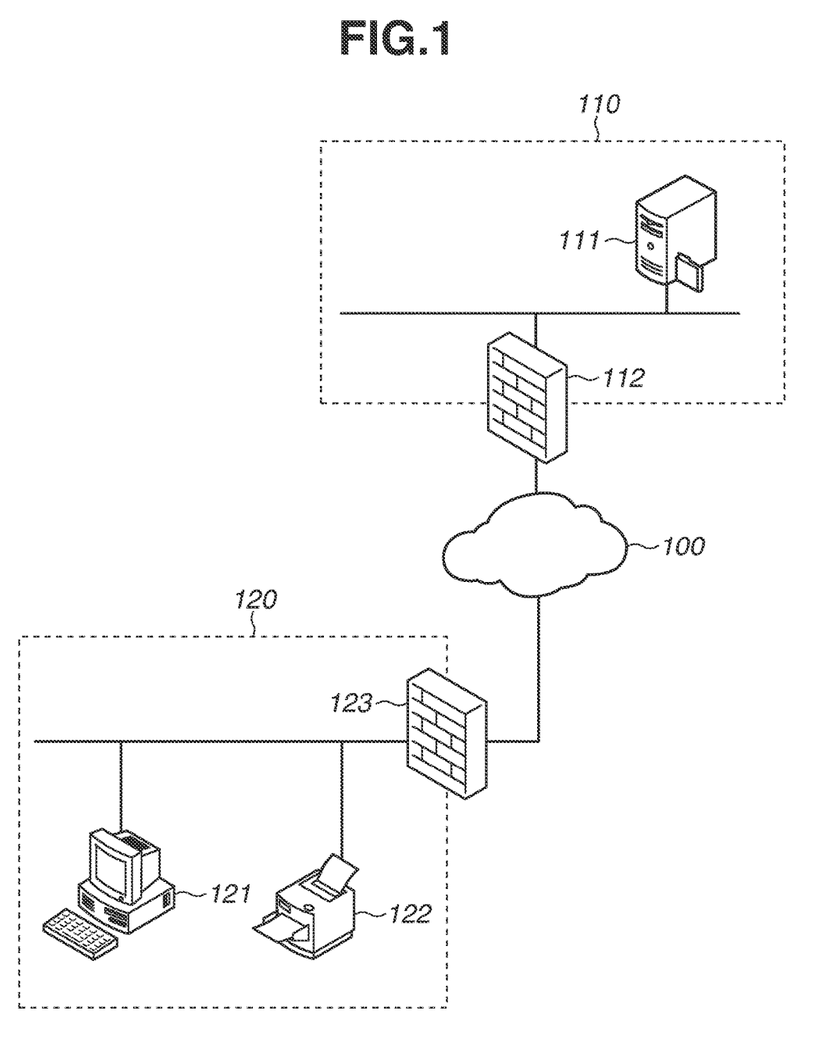
FIG. 1 illustrates an example of a network configuration according to a first exemplary embodiment.

FIG. 1 illustrates a configuration example of the entirety of a network system according to a first exemplary embodiment. The network system includes two networks, i.e., a network environment 110, which a management server 111 belongs to, and a network environment 120, which a client apparatus 121 belongs to. The network environment 110 and the network environment 120 are able to communicate with each other via a network 100, such as the Internet. However, any unnecessary communication is interrupted by a firewall 123, which is located on the side of the client apparatus 121, and a firewall 112, which is located on the side of the management server 111.

The network environment 120 includes an image processing apparatus 122, which is targeted for investigating a status of use thereof. The image processing apparatus 122 includes, for example, a printer, a copying machine, a three-dimensional (3D) printer, a scanner, a network camera, and digital medical equipment. The client apparatus 121 acquires information indicating a status of use of the image processing apparatus 122 from the image processing apparatus 122 via a network, such as a LAN, and transmits the acquired information to the management server 111 according to the functions of software installed on the client apparatus 121. Although, in FIG. 1, only one image processing apparatus 122 is illustrated, there can be a plurality of image processing apparatuses, each of which serves as an object to be managed by the management server 111 and is targeted for investing a status of use thereof. In that case, the client apparatus 121 can acquire information indicating a status of use from each of a plurality of image processing apparatuses (not illustrated) and transmit the acquired information to the management server 111. The management server 111, when accessed by the client apparatus 121, receives information indicating a status of use of the image processing apparatus 122.

Here, some accesses from the image processing apparatus 122 to the network 100, such as the Internet, may be interrupted by the firewall 123. Similarly, accesses from the network 100, such as the Internet, to the client apparatus 121 and the image processing apparatus 122 may be often interrupted by the firewall 123.

Furthermore, it is presumed that the management server 111 always has the correct date and time set using, for example, the Network Time Protocol (NTP). On the other hand, although depending on models, the image processing apparatus 122 may not have the correct date and time managed. Moreover, the client apparatus 121 may have the correct date and time set using the NTP, but may have the date and time often adjusted by the user and deviating from the date and time set on the side of the management server 111.

Next, an internal configuration of an information processing apparatus, such as the client apparatus 121, according to the first exemplary embodiment is described with reference to FIGS. 2A and 2B.

Figure 2A:
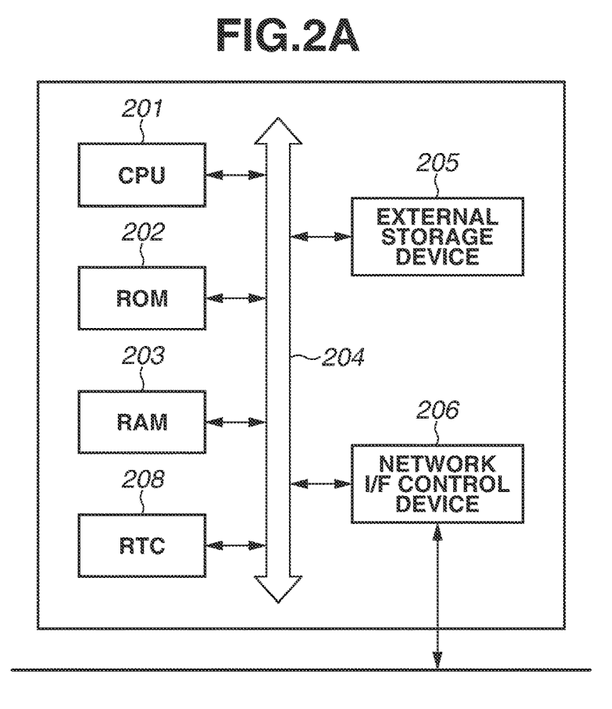
FIGS. 2A and 2B illustrate configuration examples of an information processing apparatus according to the first exemplary embodiment.

FIG. 2A illustrates an example of a hardware configuration of the information processing apparatus. The information processing apparatus includes a central processing unit (CPU) 201, which performs processing including a mixture of, for example, a graphic, image, text, and table (including a spreadsheet) based on, for example, a document processing program stored in a program read-only memory (ROM) of a ROM 202 or an external storage device 205. Various programs are stored in the ROM 202 or a random access memory (RAM) 203 of the information processing apparatus or the external storage device 205 and are executed by the CPU 201. Furthermore, the CPU 201 comprehensively controls each device connected to a system bus 204. Moreover, the program ROM of the ROM 202 or the external storage device 205 stores an operating system (OS), which is a control program for the CPU 201. Additionally, the program ROM of the ROM 202 or the external storage device 205 stores various pieces of data. The RAM 203 functions as a main memory or work area for the CPU 201. Here, processing performed by the client apparatus 121 according to the first exemplary embodiment, which is described later below, is implemented by the CPU 201 executing the corresponding control program.

The information processing apparatus further includes a network interface (I/F) control device 206, which controls transmission and reception of data with respect to a network, such as a LAN. In the configuration example illustrated in FIG. 2A, the network I/F control device 206 can be a wireless communication device. In other words, the network I/F control device 206 can be equipped with a wireless antenna and a control device therefor. The information processing apparatus further includes a real time clock (RCT) 208, which is a function of continuing measuring current time even if the information processing apparatus (computer) is powered off. The RCT 208 is currently installed on most of computers. Additionally, the information processing apparatus can further include an input and output device.

It is also presumed that the management server 111 operates as an information processing apparatus having a similar configuration to that illustrated in FIG. 2A.

Figure 2B:
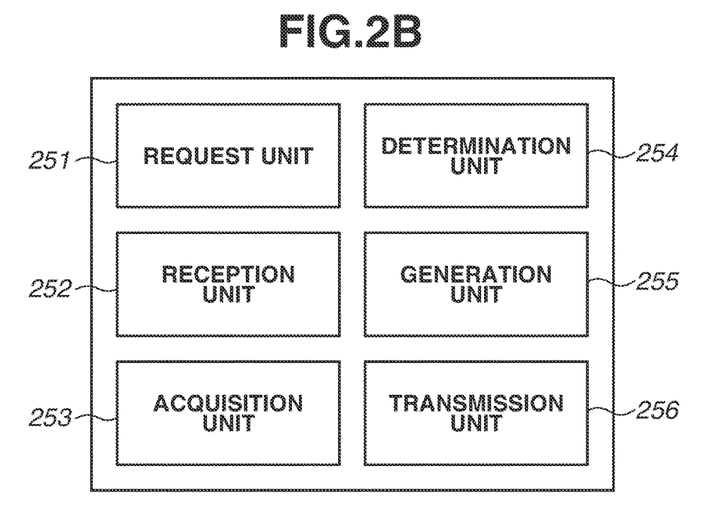

FIG. 2B illustrates a configuration example of software modules of the client apparatus 121. Furthermore, each module serving as a subject of processing implemented by executing a control program according to the first exemplary embodiment is a conceptual one.

The information processing apparatus includes a request unit 251, a reception unit 252, an acquisition unit 253, a determination unit 254, a generation unit 255, and a transmission unit 256. The request unit 251 requests information about a status of use from the image processing apparatus 122 via the network I/F control device 206. The reception unit 252 receives the information about a status of use from the image processing apparatus 122 via the network I/F control device 206. The acquisition unit 253 acquires history information, which an OS running on the client apparatus 121 records on, for example, the external storage device 205.

The determination unit 254 determines timing of data transmission to the management server 111. The generation unit 255 generates information that is to be transmitted to the management server 111 and other information. The transmission unit 256 transmits the information generated by the generation unit 255 to the management server 111 via the network I/F control device 206.

Figure 3:
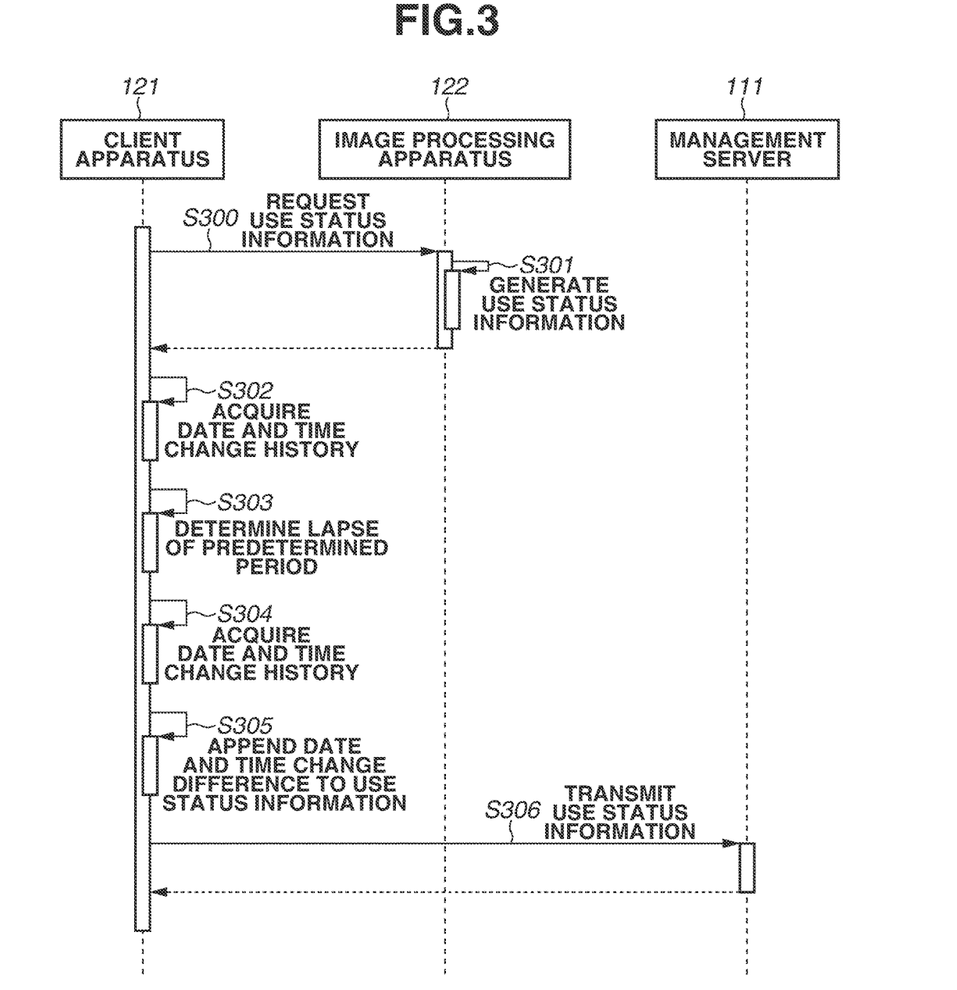
FIG. 3 illustrates a sequence of processing performed until information about a status of use is transmitted to a management server.

FIG. 3 illustrates a sequence of a series of processing performed until information about a status of use is acquired from the image processing apparatus 122 and is then transmitted to the management server 111. The sequence illustrated in FIG. 3 starts with the image processing apparatus 122 and the client apparatus 121 being already in operation. Furthermore, it is presumed that the method of communication, for example, between the client apparatus 121 and the image processing apparatus 122 is a known method, such as the Transmission Control Protocol (TCP), and the details thereof are, therefore, not described. Moreover, another communication protocol or a unique communication protocol can be used as long as the present invention can be applied thereto.

First, in step S300, the request unit 251 of the client apparatus 121 transmits a request for information about a state of use (use status information) to the image processing apparatus 122. In step S301, the image processing apparatus 122 internally generates information about a state of use in response to reception of the transmitted request. Then, the generated information is transmitted from the image processing apparatus 122 to the client apparatus 121. The information about a status of use as generated in step S301 includes the history of an error which occurred in the image processing apparatus 122 and information indicating an operational status at timing at which the request transmitted in step S300 was received. The information indicating an operational status includes information indicating, for example, a counter value or the degree of consumption of consumables in the image processing apparatus 122.

In step S302, the acquisition unit 253 of the client apparatus 121 acquires a date and time change history from a storage device included in the client apparatus 121 itself. In the present exemplary embodiment, the acquisition unit 253 acquires a date and time change history recorded by the OS on the external storage device 205. However, in a case where it is possible to hook the timing of change of date and time, instead of using information recorded by the OS, the acquisition unit 253 can record a change history by itself and then acquire the content of the record at timing in step S302.

Figure 4A:
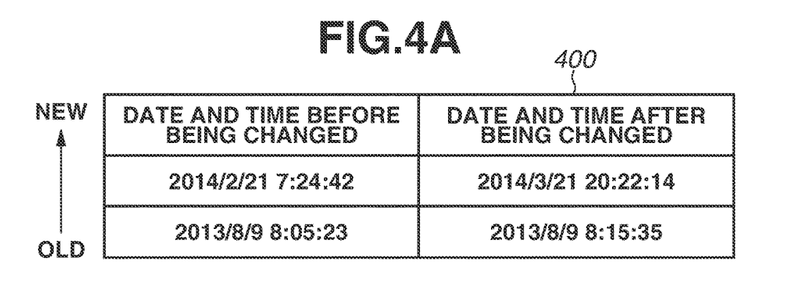
FIGS. 4A, 4B, and 4C illustrate tables each indicating a date and time change history.
Figure 4B:
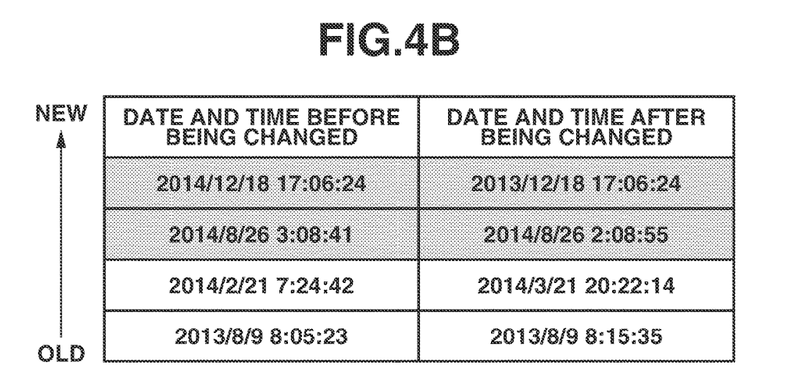
Figure 4C:
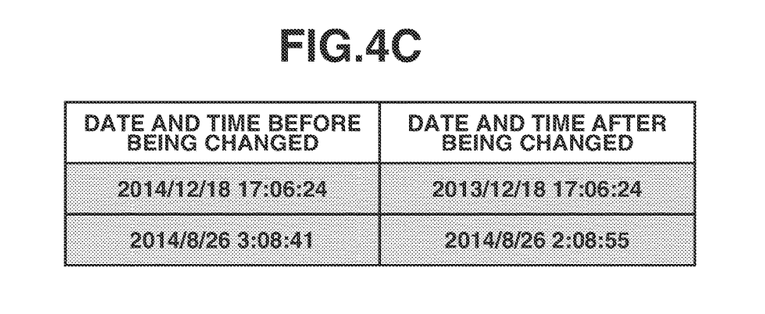

FIGS. 4A, 4B, and 4C illustrate tables each indicating a date and time change history. The date and time change history refers to data recorded in a case where the setting of date and time such as that provided by a display unit (not illustrated) of the client apparatus 121 has been changed by the user. As illustrated in FIG. 4A, the data lists, as elements, pieces of time information, each of which includes the year, month, day, and time before being changed and the year, month, day, and time after being changed, in order from the older record.

In step S303, the determination unit 254 of the client apparatus 121 determines whether a predetermined period has elapsed since the previous transmission of information about a status of use to the management server 111. If it is determined that the predetermined period has elapsed, the processing proceeds to step S304.

In step S304, the acquisition unit 253 of the client apparatus 121 acquires a date and time change history again at this timing.

In step S305, the generation unit 255 of the client apparatus 121 calculates a date and time change difference (a difference caused by the date and time change) using the date and time change histories acquired in steps S302 and S304. The difference indicates a total of times adjusted by the setting change that was performed (0 or more times) during a period from when information about a status of use was received from the image processing apparatus 122 until the information about a status of use is transmitted to the management server 111. The generation unit 255 generates information obtained by appending the calculated date and time change difference to the use status information acquired by the processing in step S300. In step S306, the transmission unit 256 of the client apparatus 121 transmits the information generated by the generation unit 255 to the management server 111.

Figure 5:
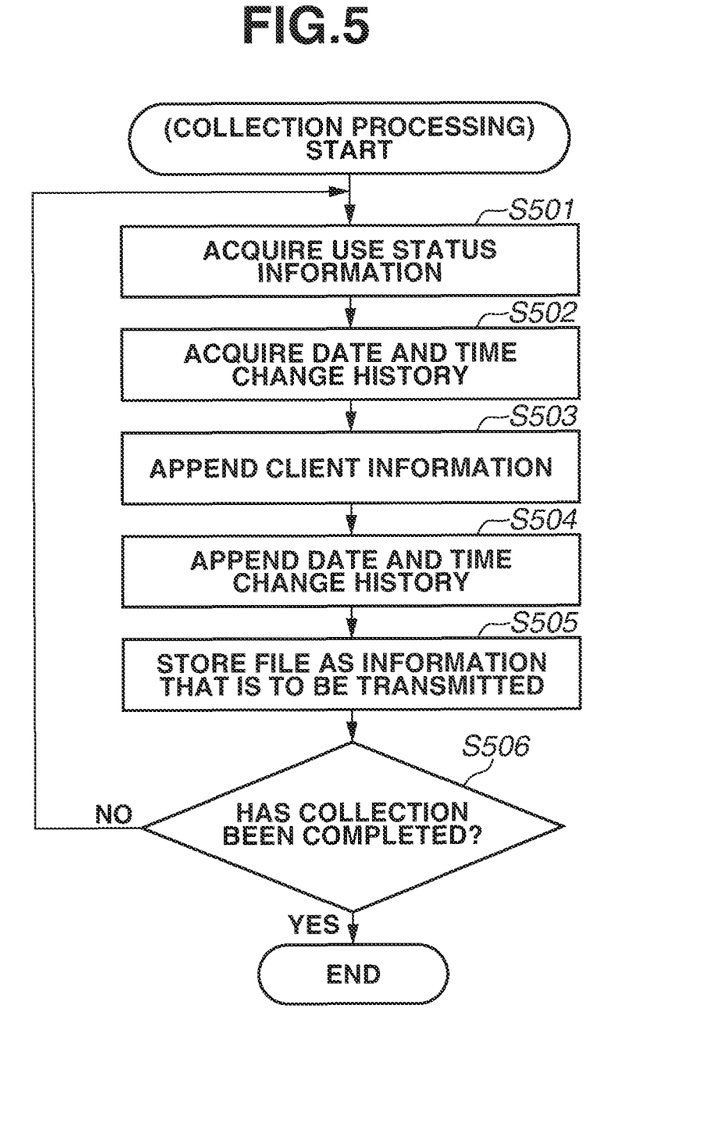
FIG. 5 is a flowchart illustrating collection processing performed by a client apparatus according to the first exemplary embodiment.
Figure 6:
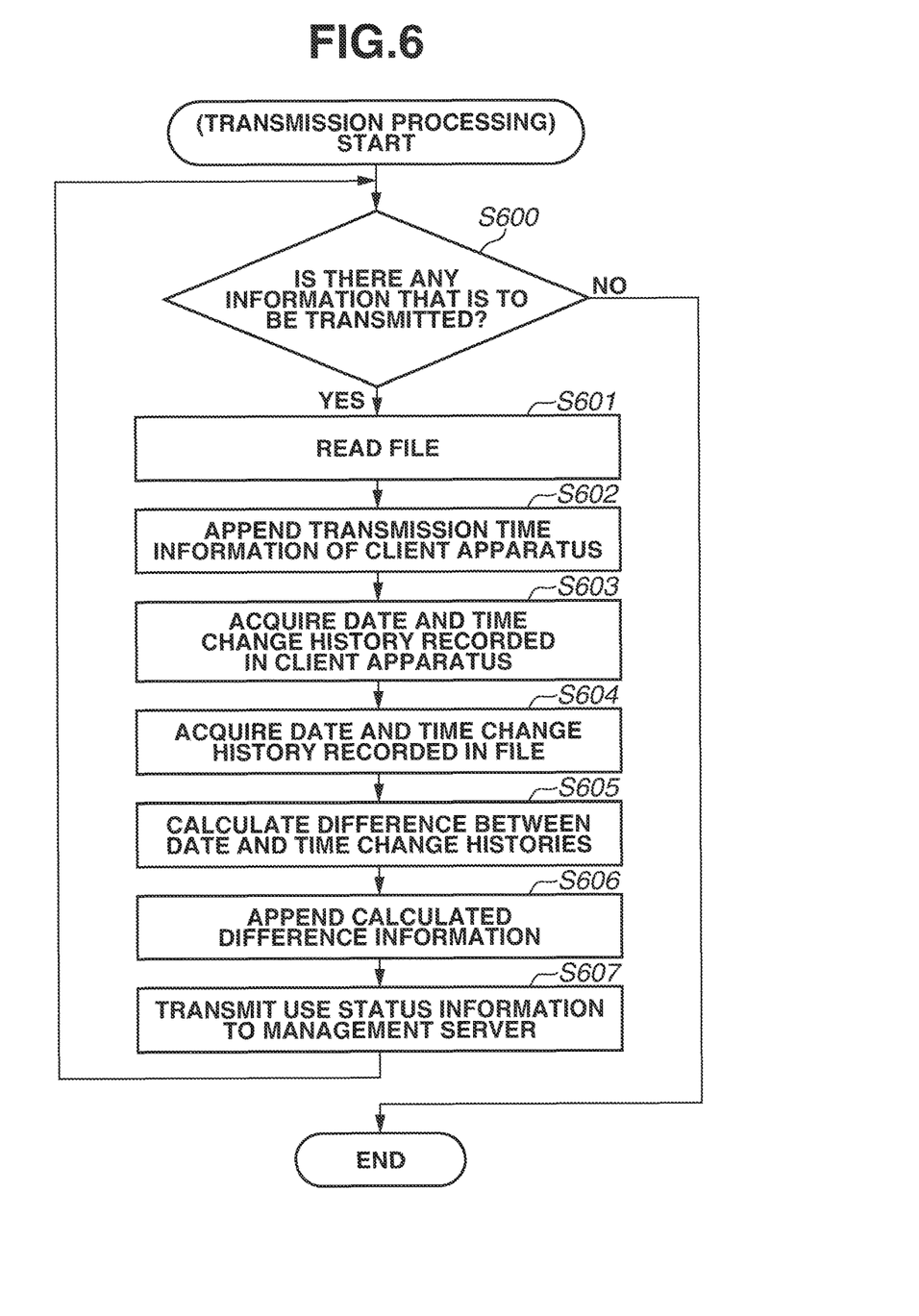
FIG. 6 is a flowchart illustrating transmission processing performed by the client apparatus according to the first exemplary embodiment.

Next, processing included in the sequence illustrated in FIG. 3 is described in detail while being divided into collection processing (FIG. 5) and transmission processing (FIG. 6). The collection processing indicates processing including steps S300 and S302, and the transmission processing indicates processing including steps S304, S305, and S306.

FIG. 5 is a flowchart illustrating the collection processing performed by the client apparatus 121. The collection processing indicates processing performed from when the client apparatus 121 collects information about a status of use from the image processing apparatus 122 until the client apparatus 121 stores the collected information, which serves as information that is to be transmitted to the management server 111, into a storage device included in the client apparatus 121.

In step S501, the request unit 251 transmits a request for information about a status of use to the image processing apparatus 122. Then, the reception unit 252 receives the information about a status of use from the image processing apparatus 122. At this time, the generation unit 255 records time (time of day) (year, month, day, and time) indicated by a clock included in the client apparatus 121. In step S502, the acquisition unit 253 acquires a date and time change history from the storage device of the client apparatus 121.

In step S503, the generation unit 255 generates a file including the information about a status of use received from the image processing apparatus 122, and then appends, to the file, client information including the type or version of the OS of the client apparatus 121. In step S504, the generation unit 255 appends the date and time change history acquired in step S502 to the file including the information about a status of use.

In step S505, the generation unit 255 stores the information generated in up to step S504, as information that is to be transmitted, into the storage device included in the client apparatus 121. The storage location for the generated information is a certain area allocated in the external storage device 205, the content of which is retained even when the client apparatus 121 is powered off. A file 700 illustrated in FIG. 7 indicates an example of the content of the file stored in step S505. The file includes items (1 to N) 701 indicating the information about a status of use acquired from the image processing apparatus 122, and each item includes a value associated with the corresponding item. The file further includes client collection date and time 702 indicating the time (time of day) (year, month, day, and time) at which the client apparatus 121 received the information about a status of use from the image processing apparatus 122. The file further includes client information 703 and a date and time change history 704 appended in steps S503 and S504, respectively. The file 700 illustrated in FIG. 7 can be of the format in which an item and a value are recorded in combination, or can be of the format in which values are merely delimited by a separator. Moreover, the file 700 can be a binary value or can be compressed or encrypted.

In step S506, the request unit 251 determines whether information collection has been completed from all of the image processing apparatuses from which information about a status of use is to be collected. If it is determined that there is any image processing apparatus from which the information about a status of use has not yet been collected (NO in step S506), the processing returns to step S501. If it is determined that the information collection has been completed (YES in step S506), the processing ends.

FIG. 6 is a flowchart illustrating the transmission processing performed by the client apparatus 121. The transmission processing indicates processing performed when the client apparatus 121 transmits the information about a status of use acquired from the image processing apparatus 122 to the management server 111.

In step S600, the generation unit 255 determines whether a file has been stored as the information that is to be transmitted as a result of the processing described with reference to FIG. 5. If it is determined that the file has been stored (YES in step S600), the processing proceeds to step S601. If it is determined that the mentioned file does not exist (NO in step S600), the processing ends.

In step S601, the generation unit 255 reads the file including the information about a status of use from the storage device included in the client apparatus 121. An example of the file read in step S602 is the file 700 illustrated in FIG. 7.

In step S602, the generation unit 255 appends, to the read file, information on the current time (year, month, day, and time) set in the client apparatus 121 as a client transmission date and time. This time information is used for the management server 111 to calculate an error in the time set in the client apparatus 121 by comparing the transmission time in the client apparatus 121 with the reception time in the management server 111.

In step S603, the acquisition unit 253 acquires the date and time change history from the storage device of the client apparatus 121. In step S604, the acquisition unit 253 acquires the date and time change history 704 recorded in the file read in step S601.

In step S605, the generation unit 255 calculates a date and time change difference using the two date and time change histories acquired in steps S603 and S604. For example, it is presumed that FIG. 4A illustrates the date and time change history acquired in step S603 and FIG. 4B illustrates the date and time change history acquired in step S604. The generation unit 255 is able to extract a history illustrated in FIG. 4C based on these two pieces of history information. The record of the two extracted histories indicates the content of setting changes performed from when the client apparatus 121 received information about a status of use from the image processing apparatus 122 until the client apparatus 121 transmits the information about a status of use to the management server 111. The date and time change difference is obtained by finding a difference between the date and time after being changed and the date and time before being changed included in the content of each of the histories illustrated in FIG. 4C and then summing the found differences. Accordingly, the difference calculated by the generation unit 255 based on the histories illustrated in FIG. 4C is "one year, one hour, and 14 seconds".

In step S606, the generation unit 255 appends, to the read file, information on the date and time change difference calculated in step S605. Furthermore, the generation unit 255 can append, to the file, information on the date and time change difference calculated in step S605 instead of the date and time change history 704 illustrated in FIG. 7. In this case, no date and time change history itself in the client apparatus 121 is transmitted to the management server 111.

Figure 7:
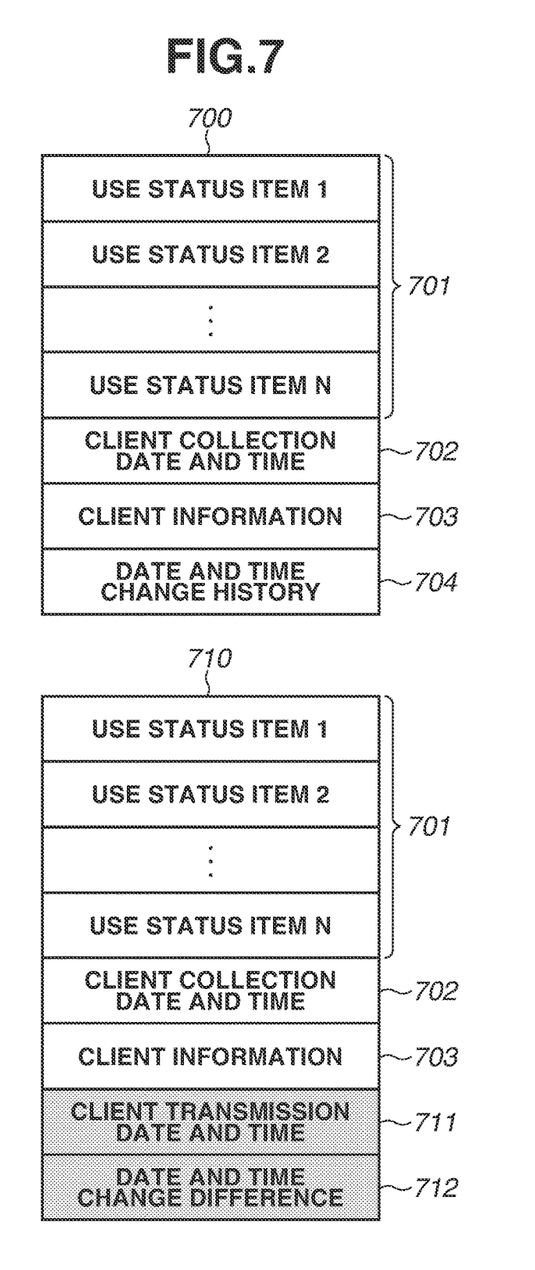
FIG. 7 illustrates examples of contents of information that is transmitted in the transmission processing.

The file including the information about a status of use obtained in step S606 is a file 710 illustrated in FIG. 7. The file 710 is obtained by appending, to the file 700 illustrated in FIG. 7, the client transmission date and time 711 in step S602 and the date and time change difference 712 in step S606. Lastly, in step S607, the transmission unit 256 transmits the file 710 including the information about a status of use to the management server 111.

The management server 111, when receiving the file 710, acquires the reception time according to clock information set in the management server 111 itself, and then stores and manages the acquired reception time as a server reception date and time together with the received file.

To perform an analysis using the information about a status of use included in the file 710 based on a clock used by the management server 111, the management server 111 finds estimated collection time as follows:

"estimated collection time"="client collection date and time 702"−"difference between client transmission date and time 711 and server reception date and time"+"date and time change difference 712"

This calculation corresponds to correcting, using two pieces of difference information, the client collection date and time 702 recorded when the client apparatus 121 collected the information about a status of use from the image processing apparatus 122.

According to the above-described exemplary embodiment, even when there is a deviation between clocks respectively used by the client apparatus 121 and the image processing apparatus 122 and even when the setting of a clock used by the client apparatus 121 was changed, for example, by the user, such an advantageous effect can be provided as to be able to estimate more appropriate time information required for the management server 111 to analyze the use status information.

Application Example 1

Furthermore, the above-described calculation of estimated collection time can be performed not by the management server 111 but by the client apparatus 121. In this case, when acquiring information on the current time in the client apparatus 121 in step S602, the client apparatus 121 requests and acquires information on the current time from the management server 111. Then, the client apparatus 121 finds a difference between the two acquired pieces of time information. After that, the client apparatus 121 calculates estimated collection time by correcting the client collection date and time 702 based on information on the found difference and the date and time change difference 712. In this instance, the generation unit 255 appends, to the file 710, the calculated estimated collection time instead of the client transmission date and time 711 and the date and time change difference 712. Then, the transmission unit 256 transmits the resultant file to the management server 111.

Application Example 2

In the above-described first exemplary embodiment, accurate collection time can be calculated by correcting information indicating the time at which the client apparatus 121 acquired information about a status of use from the image processing apparatus 122.

Here, each of use status items included in the file 710 acquired from the image processing apparatus 122 equipped with a clock has recorded therein the time at which the value of each item was recorded in the image processing apparatus 122 (for example, the time of occurrence of an error). Then, when transmitting the information about a status of use to the client apparatus 121, the image processing apparatus 122 can append information on the transmission time to the file 710, so that the client apparatus 121 can obtain a deviation between clocks respectively used by the client apparatus 121 and the image processing apparatus 122. In other words, in such a case, a deviation between the clock of the image processing apparatus 122 and the clock used by the management server 111 can also be calculated.

Accordingly, as an application of the first exemplary embodiment, information indicating the time recorded in association with each use status information recorded in the image processing apparatus 122 can also be corrected based on the clock used for analysis by the management server 111. In this instance, since the setting of the clock in the client apparatus 121 being changed, for example, by the user is taken into consideration, the same advantageous effect as that in the first exemplary embodiment can be obtained.

The above-described first exemplary embodiment has mentioned a method of estimating correct collection date and time for use status information using the date and time change history.

In steps S502 and S603, the acquisition unit 253 of the client apparatus 121 acquires a date and time change history recorded by the OS. However, the acquisition unit 253 is not always able to acquire the required date and time change history.

For example, in most cases, a buffer used by the OS to record a date and time change history as a system log is finite. Thus, as the OS continues recording some system logs, older information may be deleted. Therefore, as the period from when the information about a status of use is acquired from the image processing apparatus 122 until the acquired information is transmitted to the management server 111 is longer, it is more highly possible that the date and time change history is deleted during that period.

Also in consideration of such an environment that the possibility of acquiring a date and time change history is uncertain, an additional processing operation performed by the client apparatus 121 is described in a second exemplary embodiment.

First, with regard to the collection processing performed by the client apparatus 121 in the second exemplary embodiment, a difference from the processing illustrated in FIG. 5 of the first exemplary embodiment is described.

When, in step S502, the acquisition unit 253 of the client apparatus 121 has failed to acquire a date and time change history, then in step S504, the generation unit 255 appends, to the file that is to be recorded, information indicating the failure of acquisition as a date and time change history. Here, the processing in step S504 can be omitted to enable discerning the failure of acquisition.

Next, with regard to the transmission processing performed by the client apparatus 121 in the second exemplary embodiment, a difference from the processing illustrated in FIG. 6 of the first exemplary embodiment is described. Furthermore, the description of processing operations previously described with reference to FIG. 6 is not repeated here.

Figure 8:
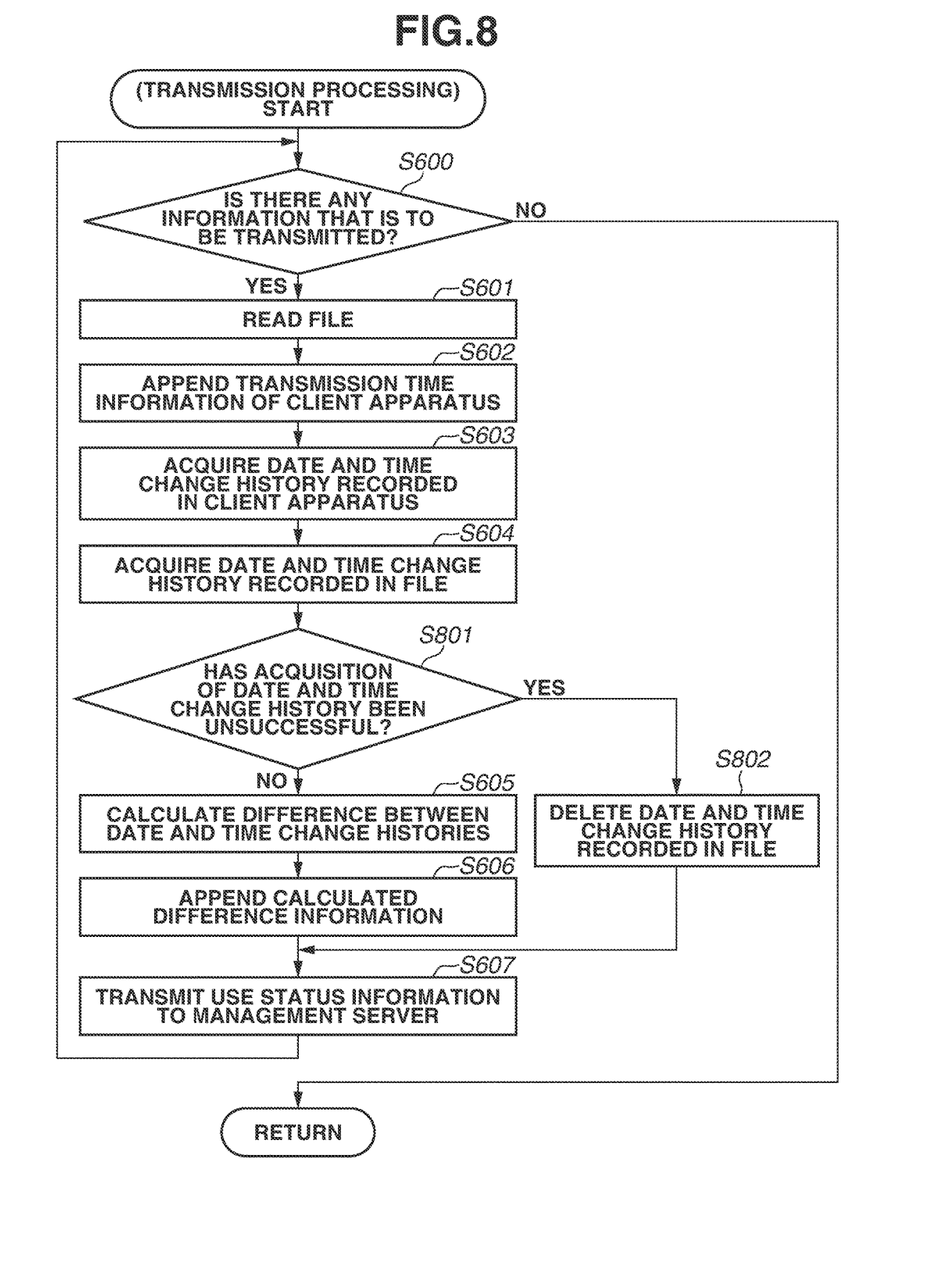
FIG. 8 is a flowchart illustrating collection processing performed by a client apparatus according to a second exemplary embodiment.

In step S801, the generation unit 255 determines whether the acquisition of a date and time change history has been unsuccessful. More specifically, if the acquisition of a date and time change history has been unsuccessful at the stage of the collection processing or if the acquisition of a date and time change history has been unsuccessful at the stage of step S603 (YES in step S801), the processing proceeds to step S802. On the other hand, if the acquisition of a date and time change history has been successful (NO in step S801), the processing proceeds to step S605. The case where the acquisition of a date and time change history has been unsuccessful at the stage of the collection processing includes a case where the file read in step S601 has information indicating the failure of acquisition recorded therein.

In step S802, the generation unit 255 deletes the date and time change history recorded in the file. Here, deleting the date and time change history recorded in the file enables the management server 111 to recognize that only an uncertain collection date and time can be calculated from the file. Furthermore, in step S802, instead of deleting the date and time change history, the generation unit 255 can append, to the file, flag information for determining that only an uncertain collection date and time can be calculated.

According to the second exemplary embodiment, the management server 111 can determine a file from which only an uncertain collection date and time can be calculated. In other words, excluding such a file from objects of analysis enables a more appropriate analysis.

The present invention should also be construed to include an apparatus, a system, and a method therefor configured by combining the above-described exemplary embodiments as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110212 filed May 29, 2015, which is hereby incorporated by reference herein in its entirety.

What is claimed is:

1. A client apparatus comprising:
a clock;
a storage device;
a memory storing instructions; and
a processor executing the instructions causing the client apparatus to:
receive, from an image processing apparatus, information about a status of use of the image processing apparatus;
acquire a first change history indicating a history of time change setting performed on the clock, which is recorded in the storage device by an operating system running on the client apparatus;
store, as a first file, time information including time indicated by the clock when the information about the status of use is received from the image processing apparatus, the acquired first change history, and the received information about the status of use into the storage device;
acquire, in a case where a determination is made that a timing at which to transmit the first file has been reached, a second change history indicating a history of time change setting performed on the clock;
generate the second file to be transmitted by further appending, to the first file, time information including time indicated by the clock when the determination is made, difference information obtained by using the first change history and the second change history; and
transmit the generated second file to a management server.

2. The client apparatus according to claim 1, wherein the difference information is appended to the first file instead of the first change history.

3. The client apparatus according to claim 1, wherein the first file further includes information about the operating system of the client apparatus.

4. The client apparatus according to claim 1, wherein, when an acquisition of the first change history has been failed, information indicating the failure of acquisition of the first change history is stored as the first change history in the first file.

5. The client apparatus according to claim 1, wherein, when an acquisition of the first change history or the second change history has failed, the information stored as the first change history included in the first file is deleted.

6. A method for a client apparatus having a clock, the method comprising:
receiving, from an image processing apparatus, information about a status of use of the image processing apparatus;
acquiring a first change history indicating a history of time change setting performed on the clock, which is recorded in a storage device of the client apparatus by an operating system running on the client apparatus;
storing, as a first file, time information including time indicated by the clock when the information about the status of use is received from the image processing apparatus, the acquired first change history, and the received information about the status of use into the storage device;
acquiring, in a case where a determination is made that a timing at which to transmit the first file has been reached, a second change history indicating a history of time change setting performed on the clock;
generating the second file to be transmitted by further appending, to the first file, time information including time indicated by the clock when the determination is made, difference information obtained by using the first change history and the second change history; and
transmitting the generated second file to a management server.

7. A non-transitory computer-readable storage medium storing computer executable instructions that, when executed by a computer, cause the computer to perform a method for a client apparatus having a clock, the method comprising:
receiving, from an image processing apparatus, information about a status of use of the image processing apparatus;
acquiring a first change history indicating a history of time change setting performed on the clock, which is recorded in a storage device of the client apparatus by an operating system running on the client apparatus;
storing, as a first file, time information including time indicated by the clock when the information about the status of use is received from the image processing apparatus, the acquired first change history, and the received information about the status of use into the storage device;
acquiring, in a case where a determination is made that a timing at which to transmit the first file has been reached, a second change history indicating a history of time change setting performed on the clock;
generating the second file to be transmitted by further appending, to the first file, time information including time indicated by the clock when the determination is made, difference information obtained by using the first change history and the second change history; and
transmitting the generated second file to a management server.

* * * * *